W. G. SHELTON.
TRANSMISSION MECHANISM.
APPLICATION FILED DEC. 16, 1914.

1,256,175.

Patented Feb. 12, 1918.
2 SHEETS—SHEET 1.

WITNESSES:
René Spuine
Fred White

INVENTOR:
William Gentry Shelton,
By Attorneys,
Fraser, Turk & Myers

W. G. SHELTON.
TRANSMISSION MECHANISM.
APPLICATION FILED DEC. 16, 1914.

1,256,175.

Patented Feb. 12, 1918.
2 SHEETS—SHEET 2.

WITNESSES:
René Bruiné
Fred White

INVENTOR :
William Gentry Shelton,
By Attorneys,
Fraser, Burk & Myers

UNITED STATES PATENT OFFICE.

WILLIAM GENTRY SHELTON, OF NEW YORK, N. Y.

TRANSMISSION MECHANISM.

1,256,175.  Specification of Letters Patent.  Patented Feb. 12, 1918.

Application filed December 16, 1914. Serial No. 877,585.

*To all whom it may concern:*

Be it known that I, WILLIAM GENTRY SHELTON, a citizen of the United States of America, residing in the borough of Manhattan, city, county, and State of New York, have invented certain new and useful Improvements in Transmission Mechanism, of which the following is a specification.

This invention relates to transmission mechanism, and has for an object to provide an improved reduction transmission which is peculiarly adapted for use in connection with small mechanisms, such, for instance, as a self-contained dental engine and hand piece.

The improvement is based upon the principles of roller or ball bearing mechanism, wherein it has been demonstrated that if the inner ring of a ball bearing be connected to the driving element and the cage be connected to the driven element, and the outer ring be impeded in its rotation, the speed communicated from the driving to the driven element will be greatly reduced. In certain classes of mechanism, as, for instance, the driving of a dental engine which is constructed as a self-contained hand tool, it is necessary that the rotary element of the electric motor be driven at a very high speed, much higher, in fact, than it is possible to rotate the drill or other instrument. Therefore, it becomes necessary to reduce the rotation. When a single reduction element of the roller type is provided between the driving and the driven elements, the speeding up of the motor, when the instrument is not at work, is frequently found to be disadvantageous. One object of the present improvement is largely to minimize this undesirable feature, and I therefore make use of a double reduction which not only serves to reduce the speed transmitted, but also to prevent the abnormal differences between the rate of rotation when the tool is at its work and when it is running idle. A plurality of connecting units formed after the analogy of a ball bearing, are illustrated in my improved structure.

Another object of the invention is to provide a combined transmission mechanism between a driving and a driven spindle and a ball bearing for supporting one or both of these elements.

In the drawings accompanying this application,

Figure 1:
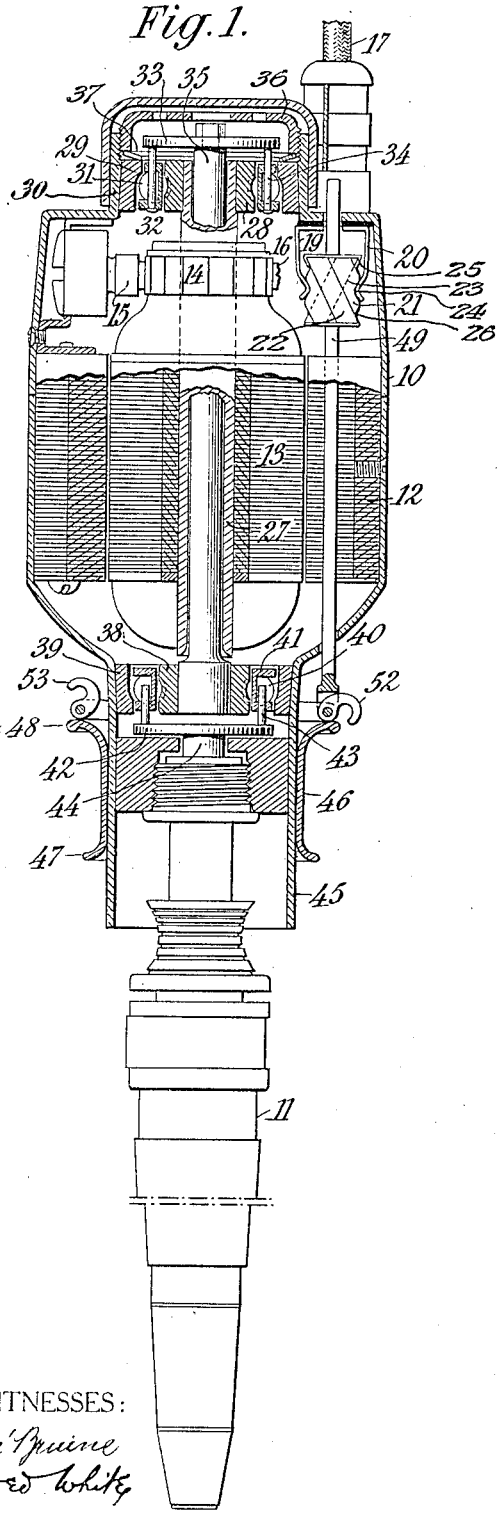
Figure 1 is a view partly in elevation and partly in central longitudinal section of a practicable embodiment of a form of my invention applied to a dental engine hand tool.
Figure 2:
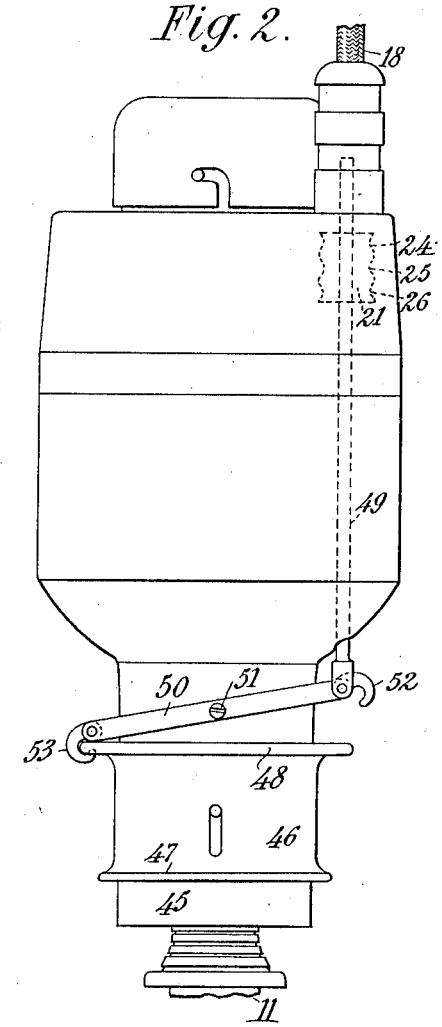
Fig. 2 is an elevation of the same.

The dental engine illustrated herein, as a demonstrative example, is of a form intended for use by the operator while held in the operating hand. There is shown a casing 10 and a drill stock 11 connected thereto in some suitable manner. There is shown carried within the casing, suitable field magnets 12 and an armature 13 which carries a commutator ring 14. Brushes 15 and 16 are shown running upon the ring 14. In the arrangement shown, the current is led into the rear end of the casing by the wires 17 and 18. The switch illustrated is a well-known form of reversing switch. A pair of contact fingers 19 and 20 are shown. The finger 19 is connected to the brush 15 and the finger 20 is connected to the brush 16. An insulation block 21 is mounted for reciprocation between the fingers 19 and 20. Obliquely disposed contact plates 22 and 23 extending in opposite directions, are carried by such block. Such block is provided on its edges with notches 24, 25 and 26, the notches being so disposed that when the fingers are in notches 25, the circuit is open, and when the fingers are in notches 24 the circuit is closed in a direction to effect the forward drive, and when the fingers are in the notches 26, the circuit is closed in the direction to cause a reverse or backward drive. In some instances it is desirable to have the various parts of the switch actuator located in such relative positions that a backward movement of the tool stock relatively to the actuator sleeve will start the rotation of the driven spindle, and a reverse movement will stop the same.

The driving part, or driving spindle, is illustrated in the form of an electric motor. The armature 13 is shown provided with a hollow shaft 27 connected to one member of the reduction transmission mechanism, which, in the present illustration, is in the form of a combined radial and thrust ball bearing, the inner ring 28 of which is fast with the rear end of the shaft. The outer ring 29 of the said ball bearing or transmission member is located within and held from rotation by a frame 30. The balls 31 are held in a suitable cage 32 and engage the inner and the outer rings. A plate 33 is shown located rearwardly of the rings and cage, and provided with pins 34 which extend into the cage between the balls. The plate is fast with a driven part or spindle 35 passing from the rear of the casing to the front thereof, through the hollow shaft 27. The outer ring 29 is shown tapering externally, and it rests in a tapering seat on the frame 30. A screw ring 36 presses on a spring washer 37 for holding the outer ring 29 from rotation. The spindle 35 is shown connected to the outer member of the reduction transmission, also shown as a ball bearing, the inner ring 38 of which is fast to said spindle, the outer ring 39 is held and prevented from rotation by the front end of the casing 10. Suitable balls 40 are disposed between said rings and in engagement therewith. A cage 41 is provided for the balls. A plate 42 is located forwardly of the rings and cage, and carries pins 43, passing through the cage and located between the balls. To this plate 42 is attached the spindle 44 which passes down through the stock 11 and is provided with a suitable chuck.

The front end of the casing 10 is provided with an elongated bearing, or sleeve, as it were, 45, upon which is mounted a collar 46 having flanged or upturned edges 47, 48, at its front and rear. This collar is located in such position relatively to the tool stock and to the center of gravity of the engine, that it will lie upon the hand of the operator between the thumb and forefinger of the operating hand. This collar constitutes the actuator for the transmission. It is preferably so located that when the operator desires to start the tool he draws the stock backward slightly with his fingers. The natural tendency in gripping the stock preparatory to applying the tool to its work, is to draw the fingers toward the hand. The connection between the collar and the switch is such that this movement throws the current through the switch in the starting or forward direction. When the operator desires to stop the instrument, the natural movement is to relax the fingers and permit a relative forward movement of the tool stock, and this relative movement between the stock and the collar opens the switch.

Mechanism is also provided for effecting a reversal from the idle position. These movements of the collar are transmitted to the switch in the following manner: The block 21 of the switch is mounted on a bar 49 which is pivoted to a lever 50. Such lever is carried by the pivot 51, and is in such position relatively to the collar that when the collar is drawn backwardly toward the casing 10, the collar will be limited in its movement by bringing the lever to normal position. A pivoted catch 52 is shown connecting one end of the lever with the flange 48 at one side, whereby a forward movement or a movement of the collar away from the housing 10 moves the lever obliquely to its normal position, this movement being such that it shifts the contact fingers into notches 24 and causes the current to move the armature in the forward direction. When it is desired to effect a reversal of movement, the catch 52 is unfastened and the catch 53 carried by the other end of the lever for engaging the other side of the flange 48 is placed in operative position, whereupon a forward or outward movement of the collar 46 swings the lever in an opposite oblique position and places the contact fingers in the notches 26, whereby the current passes through the motor in the direction to effect a reversal of the movement of the parts.

In the present form of construction both the forward drive and the reverse are effected at the same reduction, which is approximately ten to one.

In the Fig. 1 construction, one of the transmission units is placed at the front of the motor casing, and one is placed at the rear, so that these act as the ball bearings for the various parts of the mechanism.

Figure 3:
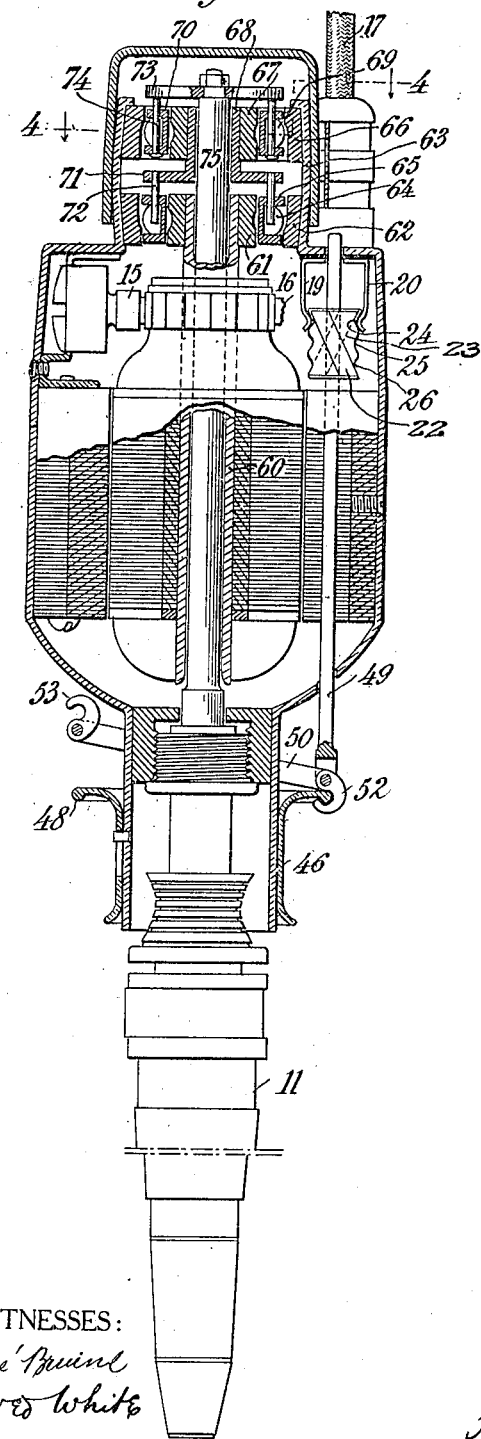
Fig. 3 is a view similar to Fig. 1, showing a different arrangement of parts.
Figure 4:
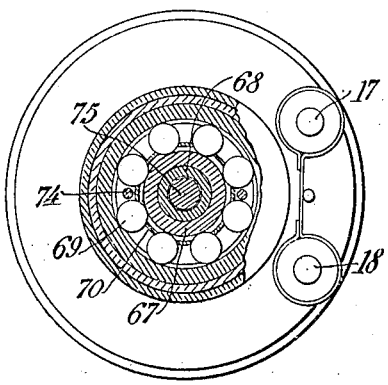
Fig. 4 is a section taken on a plane at about the line 4—4, Fig. 3, looking in the direction of the arrows, and enlarged.

In some instances it is desirable to place the transmission units in juxtaposition. An illustrating of this is illustrated in Fig. 3. The hollow armature shaft 60 is shown carrying the inner ring 61, the outer ring 62 being held and prevented from rotation by a framework 63. Suitable balls 64 are mounted between these rings, and a cage 65 is shown for the balls. The frame 63 carries the outer ring 66 of the second transmission unit or reduction unit, the inner ring 67 of which unit is shown fast upon a sleeve 68. Balls 69 are shown located between and running upon the rings 66 and 67, a cage 70 being provided for the balls. The sleeve 68 is provided with a flange 71. This flange carries pins 72 passing through the cage 65. A plate 73 is disposed outwardly of the rings 66, 67, and carries pins 74 passing through the cage 70. The spindle 75 which passes down into the drill stock 11 is shown fast with the plate 73. By this reduction construction, upon the rotation of the armature, the inner ring 61 rotates and causes a slower rotation of the cage 65. This cage is connected to the sleeve 68 which is connected to the inner ring 67, this ring is rotated at the same rate of speed as the cage 65, and through the balls, rotates the cage 70 and thereby transmits a still further reduced rotation to the spindle 75, the reduction being about one to ten.

It will be apparent that the form of the invention shown in the drawings and described is an illustrative embodiment and that changes may be made within the scope of the claims without departing from the spirit of the invention. It is also obvious that bearings having balls have been shown as a convenient means for illustrating the use of a structure formed after the analogy of a ball or roller bearing and that rollers and balls are in the present construction substantially analogous or interchangeable.

What I claim is:

1. The combination with a driving and a driven part, a pair of ball bearings constituting the sole support thereof and transmitting movement from one of the said parts to the other.

2. The combination with a driving shaft and a driven shaft, of a ball bearing constituting the sole support of one of the shafts and transmitting movement from one of the said shafts to the other.

3. A transmission mechanism comprising a driving shaft and a driven shaft, and a pair of ball bearings each provided with a cage for supporting these shafts, the said driving and driven shafts being connected through members of the said ball bearings.

4. A transmission mechanism comprising a driving shaft and a driven shaft, a pair of ball bearings supporting said shafts, means for connecting the driving shaft to one member of one of the ball bearings, means for connecting the driven shaft to one member of the other ball bearing, means for preventing rotation of another part of each bearing, the third elements of both bearings being connected together.

5. In a device of the character specified, the combination with a shaft, of two units, each comprising a ball bearing having an inner and an outer ring, a set of balls between such rings and a cage for the balls, the outer ring being held from rotation, the inner ring of one unit being fast with the said shaft, a plate located adjacent the cage of the other unit and connected thereto, a driven spindle connected to said plate, and means connecting the inner ring of the said other unit with the cage of the first mentioned unit.

6. In a device of the character specified, the combination with a casing, a shaft located therein, multiple gearing located in such casing and embodying two units, each comprising a ball bearing having an inner and an outer ring, a set of balls between such rings and a cage for the balls, the outer ring being held from rotation by the casing, the inner ring of one unit being fast with the said shaft, a plate located adjacent the cage of the other unit and connected thereto, a driven spindle connected to said plate, and means connecting the inner ring of the said other unit with the cage of the first mentioned unit.

7. In a device of the character specified, the combination with a shaft, of two units, each comprising a ball bearing having an inner and an outer ring, a set of balls between such rings and a cage for the balls, the outer ring being held from rotation, the inner ring of one unit being fast with the said shaft, a plate located adjacent the cage of the other unit and connected thereto, a driven spindle connected to said plate, and a flange fast with the inner ring of the said other unit and connected with the cage of the first mentioned unit.

8. In a device of the character specified, the combination with a casing, a shaft located therein, multiple gearing located in such casing and embodying two units, each comprising a ball bearing having an inner and an outer ring, a set of balls between such rings and a cage for the balls, the outer ring being held from rotation by the casing, the inner ring of one unit being fast with the said shaft, a plate located adjacent the cage of the other unit and connected thereto, a driven spindle connected to said plate, and a flange fast with the inner ring of the said other unit and connected with the cage of the first mentioned unit.

9. In a device of the character specified, the combination with a hollow shaft, of two units, each comprising a ball bearing having an inner and an outer ring, a set of balls between such rings and a cage for the balls, the outer ring being held from rotation, the inner ring of one unit being connected to the hollow shaft, a plate located adjacent the cage of the other unit and connected thereto, a driven spindle connected to said plate, a spindle passing through the hollow shaft and fast with the inner ring of the said other unit, and a flange on the said spindle passing through the hollow shaft, the said flange being connected with the cage of the first mentioned unit.

10. In a device of the character specified, the combination with a casing, a hollow shaft located therein, multiple gearing located in such casing and embodying two units, each comprising a ball bearing having an inner and an outer ring, a set of balls between such rings and a cage for the balls, the outer ring being held from rotation, the inner ring of one unit being connected to the hollow shaft, a plate located adjacent the cage of the other unit and connected thereto, a driven spindle connected to said plate, a spindle passing through the hollow shaft and fast with the inner ring of the said other unit, and a flange on the said spindle passing through the hollow shaft, the said flange being connected with the cage of the first mentioned unit.

In witness whereof, I have hereunto signed my name in the presence of two subscribing witnesses.

WILLIAM GENTRY SHELTON.

Witnesses:
 CHAS. LYON RUSSELL,
 GUSTAVE R. THOMPSON.

Copies of this patent may be obtained for five cents each, by addressing the "Commissioner of Patents, Washington, D. C."